3,467,751
ANTIBIOTIC A195 AND PROCESS FOR THE PREPARATION THEREOF

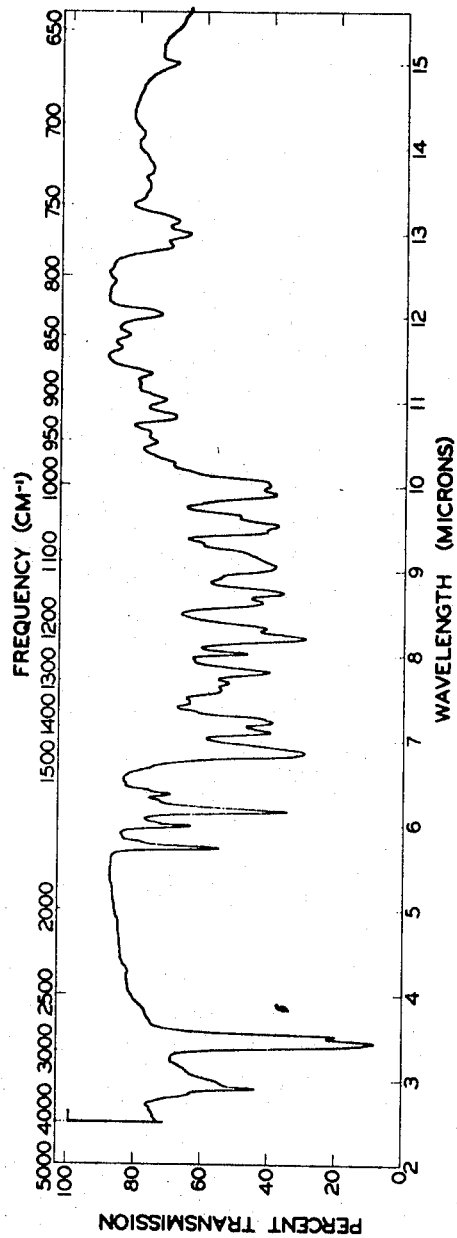

William W. Bromer, Marvin M. Hoehn, and James M. McGuire, Indianapolis, Ind., assignors to Eli Lilly and Company, Indianapolis, Ind., a corporation of Indiana
Filed Aug. 2, 1965, Ser. No. 476,614
Int. Cl. C07g 11/00; A61k 21/02; C12d 9/14
U.S. Cl. 424—119
3 Claims

ABSTRACT OF THE DISCLOSURE

Antibiotic A195 and process for the production thereof by submerged aerobic culture of *Streptomyces spadicis*, ATCC 19017. The antibiotic demonstrates antibacterial, antifungal, and anthelmintic activity.

---

This invention relates to a novel antibiotic agent and to its preparation. More particularly, this invention relates to a novel nitrogen-containing antibiotic agent denominated herein as antibiotic A195.

Antibiotic A195 is a reddish-orange crystalline solid melting with decomposition at about 194–196° C. The antiobiotic is soluble in water and most polar organic solvents, including the lower members of the alcohol, ketone and ester series. It is somewhat less soluble in chlorinated hydrocarbons and is virtually insoluble in nonpolar hydrocarbons. Because of its basic nature, it is especially soluble in dilute acids. The antibiotic is not noticeably hygroscopic. Antibiotic A195 undergoes a series of reversible color changes with changing pH. Thus, for example, solutions of the antibiotic are orange at pH 2.5–7.5, red at pH 7.5–8.5, reddish-purple at pH 8.5–9.5, and purple from pH 9.5–12. In aqueous solution, the antibiotic is stable at room temperature for at least a week over a pH range of pH 1–9. It is inactivated rather rapidly at pH values greater than pH 9. The antibiotic appears to undergo a slow inactivation when exposed to light.

Electrometric titration of A195 in 66 percent aqueous dimethylformamide indicated titratable groups having pKa values of 7.15 and 9.8. The molecular weight as determined from titration data is 877.

An average of several elemental analyses carried out on samples of A195 dried in vacuum over phosphorus pentoxide at either 80° C. or 100° C. indicates that the antibiotic has approximately the following composition: 57.82 percent carbon, 6.2 percent hydrogen, 1.71 percent nitrogen, 14.36 percent O-methyl, and 2.36 percent N-methyl.

The crystalline antibiotic in ethanol solution absorbs strongly in the visible and ultraviolet regions with absorption maxima at about 235, 258, 290 and 478 m$\mu$ with corresponding $$E_{1\,cm.}^{1\%}$$

absorptivity values of 670, 300, 120, and 200.

The infrared absorption curve of antibiotic A195 as the free base in a mineral oil mull is shown in the accompanying drawing. The following distinguishable absorption maxima are observed: 2.85 (shoulder), 2.90, 2.95 (shoulder), 3.1 (shoulder), 5.72, 5.99, 6.16, 6.35, 6.85, 7.10, 7.21, 7.44, 7.58, 7.66, 7.80, 8.01, 8.20, 8.31, 8.61, 8.73, 9.05, 9.46 (shoulder), 9.53, 9.64, 9.90, 10.01, 10.26, 10.51, 10.62, 10.81, 11.01, 11.32, 11.62, 11.78, 12.02, 12.84, 12.99, 13.15, 13.5, 13.75, 14.15, and 15.0 microns.

The antiobiotic behaves as a single entity when subjected to paper chromatography in a variety of solvent systems. On the basis of the spectral and other data, it is quite likely that A195 is a new member of the anthracycline class of antibiotics which comprises aminoglycosides of hydroxylated tetrahydronaphthacenequinones as described by Brockman, Prog. Chem. Org. Nat. Prod., 21, 121 (1963).

The acid addition salts of the antibiotic can be prepared with mineral acids such as hydrochloric acid, sulfuric acid, phosphoric acid, and the like, and also with a variety of organic acids, by employing methods well known in the art. The acid addition salt of A195 with hydrochloric acid is especially useful in achieving purification of the antibiotic. The antibiotic can be recovered from the acid addition salts in the usual manner by treating the salt with excess alkali to liberate the free base which can then be recovered by extraction or ion exchange column techniques.

The free base of A195 has an inhibitory action against the growth of microbial organisms, both bacteria and fungi, which are pathogenic to animal and plant life. The inhibitory concentrations determined by the agar dilution method for a number of illustrative organisms are shown in Table I.

TABLE I

| Test organism | Minimum inhibitory concentrations, mcg./ml. | |
|---|---|---|
| | 48 hours | 72 hours |
| Staphylococcus aureus | 3.13 | |
| Staphylococcus albus | 3.13 | |
| Bacillus subtilis | 1.56 | |
| Sarcina lutea | 1.56 | |
| Mycobacterium tuberculosis (607) | 0.78 | |
| Mycobacterium avium | 3.13 | |
| Klebsiella pneumoniae | 100 | |
| Erwinia amylovora | | 100 |
| Xanthomonas phaseoli | | 100 |
| Xanthomonas pruni | | 100 |
| Alternaria solani | | 50 |
| Certatostomella ulmi | | 100 |
| Colletotrichum lagenarium | | 100 |
| Colletotrichum phomoides | | 100 |
| Colletotrichum pisi | | 100 |
| Endoconidiophora fagacearum | | 100 |
| Pullularia sp | | 25 |
| Verticillium albo-atrum | | 25 |

When administered orally in suitable dosage forms, either alone or as a component of the diet, A195 is effective in removing from an infected host animal helmintic parasites such as pinworms, roundworms, whipworms, and the like. Thus, for example, at levels of 0.08 percent in the diet, the antibiotic is 100 percent effective in eliminating the mouse pinworm *Syphacia obvelata*, and even at doses as low as 0.02 percent in the diet, the pinworm burden is still reduced by 91 percent.

The acute toxicity of A195, determined in fasted mice and expressed as $LD_{50}$, is about 15 mg./kg. when administered intraperitoneally; orally, the $LD_{50}$ is about 750 mg./kg.

The novel antibiotic of this invention is produced by culturing a newly discovered strain of an actinomycete organism under aerobic conditions in a suitable culture medium until the culture medium contains substantial antibiotic activity. The antibiotic can be recovered by employing various isolation and purification procedures known in the art. These procedures can be employed to obtain the antibiotic in relatively pure form. A lesser degree of purifications is satisfactory when the antibiotic is to be incorporated in a feedstuff for animal use. In such case, the antibiotic need not be recovered as a solid but can, if desired, be sprayed onto the feedstuff or a carrier as a concentrated solution.

The strain of the organism which we have employed for the production of A195 was derived from a culture designated as M5-21009 and has been placed on permanent deposit with the American Type Culture Collection at Washington, D.C. The culture has been assigned the accession number ATCC 19017.

Because of the uncertainty of taxonomic studies with the Streptomyces group of organisms, there is always an element of doubt assigned with the classification of a newly discovered organism. The organism which produces A195 has been compared with cultures of three similar streptomyces species, *S. antibioticus* (NRRL B546), *S. bikiniensis* (NRRL B1049), and *S. felleus* (NRRL 2251). None of these organisms produce A195 during fermentation. The organism which produces A195 appears to resemble most nearly the *S. bikiniensis* species. However, there are sufficient differences between the two organisms to require the establishment of the A195 organism as a new Streptomyces species which has been named *Streptomyces spadicis*. More particularly, the presently employed organism and *S. bikiniensis* differ as to spore size and shape, vegetative color on most media observed, color of the soluble pigment produced and in the utilization of five individual carbon sources.

The organism which produces A195 was isolated from a soil sample by suspending portions of the sample in sterile distilled water and streaking the suspensions on nutrient agar. The seeded nutrient agar plates were incubated at 25-35° C. until organism growth was observed. At the end of the incubation period, colonies of the organisms were transferred by means of a sterile platinum loop to agar slants. The slants were then incubated to provide suitable quantities of inoculum for the production of A195.

The methods employed in the taxonomic studies of A195 producing strain of *Streptomyces spadicis* ATCC 19017 are those commonly employed in the taxonomy of actinomycetes. Carbon utilization tests were carried out according to the method described by Pridham and Gottlieb, J. Bact., 56, 107 (1948). Results of the taxonomic studies are summarized in the paragraphs which follow. Observations were made after incubation at 30° C. for 14 days. Carbon utilization was determined after 10 and 20 days at the same temperature. The numbers in parentheses refer to color blocks in Maerz and Paul, Dictionary of Color (1950).

MICROSCOPIC MORPHOLOGY, CULTURE CHARACTERISTICS, AND PHYSIOLOGY

Spore chain morphology.—Spores normally range from 10-15 per chain. The spores are smooth when observed with the electron microscopic and no accessory structures are discernible. The spores are coccoid to oval and measure $0.7-1.7\mu$ by $0.7-1.4\mu$. Spores occur in straight or flexuous chains.

Colony characteristics on:

Tomato-paste—oatmeal.—Excellent growth, with gray. (37-A1) aerial mycelium; reverse dark red-brown; soluble pigment red-brown.

Nutrient agar.—Moderate growth, with white aerial mycelium, pale gray at the center; reverse light red-brown; red-brown soluble pigment.

Yeast extract agar.—Moderate growth, with light gray (14-A2) aerial mycelium; reverse brown-red; soluble pigment brown-red.

Calcium malate agar.—Growth moderate, aerial mycelium blue-gray (45-A3); reverse orange-brown; soluble pigment orange-pink.

Inorganic salts—starch agar.—Excellent growth, with gray (37-A4) aerial mycelium; reverse and soluble pigment both yellow-brown.

Czapek's agar.—Sparse growth, with gray (37-A1) aerial mycelium; reverse hyaline; no soluble pigment.

Potato plug.—Excellent growth, with pale pink-gray (43-B1) aerial mycelium; plug darkened; vegetative growth orange-brown.

Malt extract—yeast extract—glucose agar.—Fair growth, with a fair gray (14-A1) aerial mycelium; reverse and soluble pigment both yellow-brown (3-A11).

Emerson's agar.—Moderate growth, with moderate grayish yellow-pink (4-A9) aerial mycelium; reverse strong brown (6-B12); brown soluble pigment.

Bennett's agar.—Moderate growth, with moderate light olive-gray (14-A1) aerial mycelium; reverse medium orange (9-F7); orange (9-B8) soluble pigment.

Tyrosine agar.—Moderate growth, with moderate gray (13-A1) aerial mycelium; reverse medium yellow-brown; no soluble pigment.

Glucose—asparagine agar.—Fair growth, with fair gray (12-A1) aerial mycelium; reverse grayish yellow; no soluble pigment.

Glycerol—asparagine agar.—Moderate growth, with moderate gray (13-A1) aerial mycelium; reverse grayish yellow (11-J6); slight yellow-brown soluble pigment.

PHYSIOLOGICAL CHARACTERISTICS

Temperature requirements on tomato-paste—oatmeal agar.—At 15° C., growth is sparse with a sparse white aerial mycelium. At 26° C., growth is moderate with a fair gray aerial mycelium. At 30, 37, and 43° C., abundant growth is observed with a moderate pinkish gray aerial mycelium. At 50° C., growth is scant with a scant white aerial mycelium.

Action on milk.—Light red-brown ring formed, no coagulation observed; moderate hydrolysis, becoming acid; soluble brown pigment.

Nutrient gelatin.—Complete liquefaction at 14 days

Nitrate reduction.—Negative.

$H_2S$ production.—Positive.

Microaerophilic growth on malt extract agar at 30° C.—Positive.

No change in the color of the soluble pigment was observed when the pigment was subjected to 0.05 N hydrochloric acid or sodium hydroxide.

The following table summarizes the results of the carbon utilization tests carried out on the A195 producing organism. In the table the symbols employed are interpreted as follows:

+ =growth
(+)=probable growth
— =no growth
(—)=questionable growth

TABLE II

Carbon utilization of *Streptomyces spadicis* ATCC 19017

| Carbon source | Response |
|---|---|
| L(+) Rhamnose | (+) |
| D(+) Ribose | + |
| D(+) Xylose | + |
| Dextrose | + |
| D(—) Fructose | + |
| Mannose | + |
| Lactose | + |
| Maltose | + |
| Sucrose | — |
| D(+) Trehalose | + |
| Inulin | (—) |
| D(+) Raffinose | + |
| i-Inositol | (—) |
| d-Mannitol | + |
| d-Sorbitol | (—) |
| Cellulose | — |
| Salicin | — |
| Control (no carbon) | — |

*Streptomyces spadicis* ATCC 19017 can be grown in any of a number of culture media to produce antibiotic A195, since, as is evident from the above-described utilization tests, the organism is capable of utilizing energy from a variety of sources. However, for economy of production, maximum yield and ease of isolation of the antibiotic, certain culture media are preferred. Thus, for example, cerelose is one of the preferred sources of carbohydrate, although glucose, fructose, maltose, mannitol, starch, and the like can also be employed. Preferred sources of nitrogen include cornsteep, soybean meal, peptones, distillers' solubles, and the like. Inorganic salts can also be employed as a source of nitrogen.

Nutrient inorganic salts to be incorporated in the culture media can include the customary salts capable of yielding sodium, potassium, ammonium, calcium, phosphate, chloride, sulfate, acetate, carbonate, and like ions. Additionally, sources of growth factors such as distillers' solubles and yeast extracts can be included with enhanced results.

As is necessary for the growth and development of other microorganisms, essential trace elements should also be included in the culture medium for growing the actinomycete employed in this invention. Such trace elements are commonly supplied as impurities incidental to the addition of other constituents to the media.

The organism used to produce A195 is tolerant of considerable variations as to growth conditions. Thus, for example, the organism will grow in numerous media of widely varied pH. However, prior to inoculation with the organism, it is desirable to adjust the pH of the culture medium to between about pH 6 and pH 7.5 depending upon the particular medium employed. As is the case with other actinomycetes, the medium gradually becomes more alkaline and may attain a pH from about pH 7 to about pH 8 or higher during the growth period of the organism while A195 is being produced. The final pH is determined, at least in part, by the initial pH of the medium, the buffers present in the medium, and the period of time for which the organism is permitted to grow.

Small quantities of the antibiotic are obtained conveniently by shake flasks and surface culture in bottles. For the production of substantial amounts of A195, however, submerged aerobic culture in large tanks is preferably employed, just as for other antibiotics. In order to avoid a pronounced lag in the production of the antibiotic with the attendant inefficient utilization of equipment, it is preferred to use the vegetative rather than the spore form of the organism for inoculation of the medium in the production tanks. Accordingly, a vegetative inoculum of the organism is first prepared by inoculating a relatively small quantity of the culture medium with the spore form of the organism, and the young active vegetative inoculum so obtained is then transferred aseptically to the large production tanks. The medium in which the vegetative inoculum is produced can be the same as that utilized for the production of the antibiotic, although other media can also be employed advantageously.

The organism can be grown well at temperatures between about 25 and about 45° C. Optimal production of A195 appears to occur when the culture medium is maintained at about 28–33° C.

As is customary in producing antibiotics by submerged culture processes, sterile air is blown through the culture medium. For efficient growth of the organism and antibiotic production, the volume of air employed in the tank production of A195 is preferably one-tenth volume of air per minute per volume of culture medium or greater. Optimal growth and antibiotic production are secured when the volume of air used is at least one-half volume of air per minute per volume of culture broth.

The rate of production of A195 and the concentration of the antibiotic activity in the culture medium can be followed readily during the growth period of the microorganism by testing samples of the culture medium for their antibiotic activity against organisms known to be susceptible to the antibiotic. A suitable assay method for A195 employs the plate assay with *Bacillus subtilis*. Any of the conventional bioassay techniques can be employed, however, such as the standard turbidimetric or cup-plate methods as well as the paper disc assay upon agar plates.

In general, maximum production of the antibiotic occurs within about 2 to 5 days after inoculation of the culture medium when submerged aerobic culture or shake flask culture is employed and within about 5 to 10 days when surface culture is used.

Antibiotic A195 can be recovered from the culture medium and separated from other substances which may be present by extractive and adsorptive techniques. Generally speaking, a combination of adsorptive processes with extractive techniques is preferred for the recovery of A195 because such a procedure minimizes the large volumes of solvents required when extractive techniques are employed exclusively. Suitable adsorbents for separating the antibiotic from the filtered culture broth include powdered carbon and a variety of cation exchange resins. The antibiotic retained on the adsorbing agent can be recovered by customary elution procedures. Preferred eluents are dilute aqueous solutions of organic or mineral acids or concentrated salt solution.

For the recovery of A195 in relatively small quantities, extractive techniques can be employed exclusively. Thus, for example, the crude broth can be adjusted to a relatively low pH to insure that the antibiotic will remain in solution in the form of its acid addition salt and can then be filtered. The filtrate can then be adjusted to about pH 8.5 to liberate the antibiotic in the form of its free base, and the antibiotic can be extracted with a suitable solvent such as ethyl acetate and the like. Concentration of the antibiotic-containing extracts followed by the addition of the concentrate to a relatively large volume of an organic solvent in which the antibiotic is insoluble, such as for example, petroleum ether, results in the precipitation of the solid antibiotic material. Additional purification of the solid antibiotic can be effected by recrystallization from suitable solvents or solvent mixtures. A preferred solvent for recrystallization is methanol. Purification to a high degree of purity can be accomplished by chromatography of solutions of the antibiotic on columns packed with adsorbents, such as alumina, Florisil, and the like. The antibiotic can also be purified to a relatively high degree as its hydrochloride salt by precipitating the said salt from a solution of the crude antibiotic in an anhydrous organic solvent by passing dry hydrogen chloride into such solution.

This invention is further illustrated by the following specific examples. Although the descriptions contained herein are made with particular reference to the newly found organism *Streptomyces spadicis* ATCC 19017, it is to be understood that the production of A195 by the growing of other A195 producing strains of the same species or mutants thereof, including mutants of *Streptomyces spadicis* ATCC 19017, are within the scope of this invention. Such strains or mutants can be produced by known procedures, such as by subjecting a strain of the species to X-ray or ultraviolet radiation or to action of chemical agents, such as for example, the nitrogen mustards.

EXAMPLE 1

Spores of *Streptomcyes spadicis*, strain ATCC 19017, are inoculated on an asparagine-beef extract agar slant having the following composition:

Starch _____ g-- 20
Asparagine _____ g--  1
Beef extract _____ g--  3
Agar _____ g-- 20
Water, q.s. to make 1 l.

The slant is incubated for about five days at about 30° C. and is then covered with a small amount of sterile distilled water and scraped gently to loosen the spores and to obtain an aqueous suspension thereof.

One milliliter of the spore suspension so obtained is employed to inoculate 100 ml. of a sterile vegetative growth medium having the following composition per liter:

| | |
|---|---|
| Cerelose | g  15 |
| Soybean meal | g  15 |
| Cornsteep solids | g  5 |
| Sodium chloride | g  5 |
| Calcium carbonate | g  2 |
| Water, q.s. to make 1 l. | |

The inoculated vegetative medium is grown for 48 hours at about 30° C. on a rotary shaker operating at 250 r.p.m. in order to produce the vegetative form of the organism. This vegetative inoculum is then employed to inoculate a sterile production culture medium, sterilized at 120° C. for 30 minutes, having a composition identical to that of the vegetative medium. In shake flask fermentations 100-ml. portions of the production medium are inoculated with 5-ml. portions of the vegetative inoculum prepared as above described. The antibiotic is found in the broth after fermentation for five days.

EXAMPLE 2

A culture of *Streptomyces spadicis*, strain ATCC 19017, was prepared and maintained on a tryptone agar slant having the following composition:

| | |
|---|---|
| Dextrose | g  5 |
| Soluble starch | g  5 |
| Tryptone | g  5 |
| Betaine | g  0.5 |
| Distillers' solubles | g  0.2 |
| $K_2HPO_4$ | g  0.2 |
| NaCl | g  10 |
| $CaCl_2 \cdot 2H_2O$ | g  0.08 |
| Mineral mixture [1] | ml  2 |
| Agar | g  20 |
| Deionized water | ml  1000 |

[1] The mineral mixture had the following composition per liter:

| | |
|---|---|
| $MgSO_4 \cdot 7H_2O$ | g  100 |
| $FeSO_4 \cdot 7H_2O$ | g  [a] 2 |
| $ZnSO_4 \cdot 7H_2O$ | g  1 |
| $CuSO_4 \cdot 5H_2O$ | g  0.5 |
| $MnSO_4 \cdot 5H_2O$ | g  0.4 |
| $CoCl_2 \cdot 6H_2O$ | g  0.1 |
| Deionized water, q.s. to make 1 l. | |

[a] Dissolved in 1 ml. of concentrated hydrochloric acid.

A portion of the culture was transferred by means of a sterile platinum loop into 80 ml. of a sterile seed-bump medium contained in a 500-ml. Erlenmeyer flask. The medium had the following composition:

| | |
|---|---|
| Dextrose | g  10 |
| Peptone | g  5 |
| Beef extract | g  5 |
| Yeast extract | g  2.5 |
| Sodium chloride | g  5 |
| Cornsteep liquor | g  10 |
| Tap water, q.s. to make 1 l. | |

The pH of the medium was adjusted to pH 7.2 before sterilization. The flask was incubated on a rotary shaker for about 48 hours at 30° C. A 25-ml. portion of the seed-bump culture was employed to inoculate one liter of the same medium contained in a 4-liter Erlenmeyer flask. After incubation on a rotary shaker for about 30 hours at 30° C., the contents of the flask were employed to inoculate 25 liters of production medium contained in a fermentation tank equipped with a single 5-inch 6-bladed impeller. The production medium employed had the following composition:

| | |
|---|---|
| Dextrose | g  6 |
| Soybean oil meal | g  20 |
| Yeast | g  5 |
| Sodium chloride | g  5 |
| Calcium carbonate | g  2 |
| Cobalt chloride | g  0.001 |
| Crude soybean oil | ml  2 |
| P2000 [1] | ml  0.08 |
| Water, q.s. to make 1 l. | |

[1] P2000 is a trademark designation for a polyethylene glycol having an average molecular weight of about 2000.

The fermentor was stirred at 500 r.p.m. while the fermentation was carried out at 32° C. for about 88 hours. Aeration was maintained at the rate of one-half volume of air per minute per volume of medium during the course of the fermentation.

The contents of the two fermentation tanks were combined to yield 46 liters of fermentation broth. The pH of the medium was adjusted to pH 3.8 by the addition of sulfuric acid, and 2.3 kg. of a commercial filter aid were added. The mixture was filtered by gravity and the mycelial cake was washed with about 3.5 liters of acetone. The wash was concentrated in vacuo and added to the broth filtrate which was treated with aqueous sodium hydroxide to pH 8.5. The filtrate was extracted twice with 23 liters of ethyl acetate. The combined ethyl acetate extracts were concentrated in vacuo to about 320 ml. and the crude antibiotic was precipitated by adding the ethyl acetate concentrate to about 3 liters of petroleum ether. The supernatant liquid was decanted and the orange-red precipitate which remained was washed with one liter of petroleum ether, separated from the solvent and dried in vacuo. An additional quantity of crude antibiotic was obtained by thorough washing of the mycelial cake with ethyl acetate, concentrating the ethyl acetate extract and precipitating the crude antibiotic by pouring into the petroleum ether as above. Additional purification of the antibiotic was accomplished by dissolving 159 g. of the crude product in 320 ml. of boiling methanol and permitting crystallization to take place. The suspension of crystals was centrifuged and, after the supernatant solvent had been removed, the crystals were washed with cold methanol and dried in vacuo to yield pure A195.

We claim:

1. A method of producing antibiotic A195 which comprises cultivating *Streptomyces spadicis* ATCC 19017 in a culture medium containing assimilable sources of carbon, nitrogen and inorganic salts under submerged aerobic conditions until a substantial amount of A195 is produced by said organism in said culture medium.

2. A method of producing antibiotic A195 which comprises cultivating *Streptomyces spadicis* ATCC 19017 in a culture medium containing assimilable sources of carbon, nitrogen and inorganic salts under submerged aerobic conditions until a substantial amount of A195 is produced by said organism in said culture medium and recovering the A195 from said culture medium.

3. A compound selected from the group consisting of the antibiotic A195 and the acid addition salts thereof, said antibiotic being a reddish-orange crystalline solid melting with decomposition at about 194–196° C.; which is soluble in water and most polar organic solvents including the lower alcohols, lower ketones, and lower esters, somewhat less soluble in chlorinated hydrocarbons, and virtually insoluble in nonpolar solvents; which has titratable groups of pKa 7.15 and 9.8 in 66 percent aqueous dimethylformamide; which has the approximate composition of 57.82 percent carbon, 6.2 percent hydrogen, 1.71 percent nitrogen, 14.36 percent O-methyl and 2.36 percent N-methyl; which has a molecular weight, as calculated from titration data, of about 877; which, in ethanol solution, absorbs strongly in the visible and ultraviolet regions with absorption maxima at about 235, 258, 290, and 478 mμ with corresponding $$E_{1\,cm.}^{1\%}$$

values of 670, 300, 120, and 200; and which, as a mull in mineral oil, has the following distinguishable bands in its infrared absorption spectra: 2.85 (shoulder), 2.90, 2.95 (shoulder), 3.1 (shoulder), 5.72, 5.99, 6.16, 6.35, 6.85, 7.10, 7.21, 7.44, 7.58, 7.66, 7.80, 8.01, 8.20, 8.31, 8.61, 8.73, 9.05, 9.46 (shoulder), 9.53, 9.64, 9.90, 10.01, 10.26, 10.51, 10.62, 10.81, 11.01, 11.32, 11.62, 11.78, 12.02, 12.84, 12.99, 13.15, 13.5, 13.75, 14.15, and 15.0 microns.

References Cited

UNITED STATES PATENTS 3,359,165  12/1967  Bergy et al. _____ 424—119
3,377,244  4/1968  Whaley et al. _____ 424—119

FRANK CACCIAPAGLIA, Jr., Primary Examiner

J. GOLDBERG, Assistant Examiner

U.S. Cl. X.R.

195—180